Patented Dec. 3, 1940

2,224,360

UNITED STATES PATENT OFFICE 2,224,360

PROCESS OF MANUFACTURING WASHING, CLEANSING, WETTING, AND EMULSIFYING AGENTS

Meindert Danius Rozenbroek, Delden, Twente, Overijsel, Netherlands, assignor of one-half to Naamlooze Vennootschap: Chemische Fabriek Servo, Delden, Twente, Overijsel, Netherlands, a corporation of the Netherlands No Drawing. Application August 24, 1937, Serial No. 160,728. In the Netherlands August 26, 1936

6 Claims. (Cl. 260—458)

It has been proposed to manufacture washing, cleansing, wetting and emulsifying agents by esterifying one of the hydroxy groups of an acid derived from boron or phosphorus with a higher alcohol, a partial ether of a higher alcohol with a lower polyhydric alcohol or an ester of a higher fatty acid with a lower polyhydric alcohol and sulphonating the compound obtained in this way. Processes of this character have been described in British Patent No. 452,508.

It has now been found that improved washing, cleansing, wetting and emulsifying agents can be obtained by esterifying one or more of the hydroxy groups of an acid derived from boron or phosphorus with a hydroxy compound of high molecular weight of the character indicated above and another of the free hydroxy groups of the said acid with a lower monohydric hydroxy compound and sulphonating the compound obtained.

The hydroxy compound of high molecular weight may be an alcohol which, if it belongs to the aliphatic series, must contain at least 8 carbon atoms. The alcohol may be an aliphatic or cyclic, primary, secondary or tertiary alcohol and it may be monohydric or polyhydric, saturated or unsaturated and elaidinized or non-elaidinized.

The hydroxy compound of high molecular weight may also be a partial ether of a higher alcohol with a lower polyhydric alcohol. The partial ether contains a free hydroxy group of the lower polyhydric alcohol which can be esterified with the hydroxy group of the acid derived from boron or phosphorus.

Other hydroxy compounds of high molecular weight suitable for the present purpose are esters of higher fatty acids with lower polyhydric alcohols. The fatty acid can be saturated or unsaturated and elaidinized or non-elaidinized. It may contain one or more hydroxy groups and one or more side chains attached to the main chain either directly or by means of an oxygen or nitrogen atom, as described in specification No. 708,332. Naphthenic acids may be used for the present purpose instead of the higher fatty acids properly speaking.

The lower polyhydric alcohols mentioned above may contain two or more primary, secondary or tertiary hydroxy groups. They can also be of a mixed character, e. g. they may contain both one or more primary and one or more secondary or tertiary groups and they may be saturated or unsaturated. If they contain three or more hydroxy groups there are still one or more hydroxy groups left after etherifying one hydroxy group of the lower polyhydric alcohol with the higher alcohol or esterifying the said hydroxy group with the higher fatty acid and esterifying another hydroxy group of the lower polyhydric alcohol with the inorganic acid. The remaining hydroxy group or groups may be present in the final product in free state or they may be esterified with a lower fatty acid or etherified with a lower alcohol, which in some cases has certain advantages.

When using the term "polyhydric alcohol" in the specification I wish it to be understood that this term also comprises the partial ethers of the said alcohols containing two or more molecules of the same or of different lower polyhydric alcohols, e. g. diglycol ether, glycol glycerol ether, etc. In some cases it is advantageous that the polyhydric alcohol contains a side chain attached to the main chain either directly or by means of an oxygen or nitrogen atom. Examples of substances of this character are 2 methyl butane diol 1.3 and 2.2′ dimethyl propane 1.3.

The lower polyhydric alcohol may further contain one or more keto or aldehyde groups or amino groups.

The lower monohydric hydroxy compound with which one or more of the free hydroxy groups of the acid derived from boron or phosphorus is esterified can be a lower monohydric alcohol. With a lower monohydric alcohol I mean an alcohol which contains a number of carbon atoms not exceeding 8 if the alcohol belongs to the aliphatic series. The monohydric alcohol may be a primary, secondary or tertiary alcohol, it may be saturated or unsaturated, it may have a straight chain or a branched chain and it may belong to the aliphatic or to the cyclic series.

Instead of the lower monohydric alcohol I may also use a partial ether of a lower monohydric alcohol with a lower polyhydric alcohol or a partial ester of a lower carboxylic acid with a lower polyhydric alcohol. Instead of the lower monohydric alcohol I may also use amines or amino alcohols. The lower polyhydric alcohol may contain one or more further hydroxy groups, keto groups or aldehyde groups.

In the compounds according to the invention the phosphorus may be trivalent or pentavalent. They are generally derived from boric acid $H_3BO_3$, phosphorous acid $H_3PO_3$ or phosphoric acid $H_3PO_4$.

The textile agents according to the invention are obtained by sulphonating the abovementioned compounds with sulphonating agents such as sulphuric acid, sulphuric anhydride, chlorosulphonic acid, etc., according to well known processes. The products obtained may be sulphuric acid esters or true sulphonic acids; they often consist of mixtures of the said two groups or sulphonated compounds.

In order to explain the invention I shall describe the configuration of the compounds used and the intermediate products by way of example.

The esters of boric acid with the hydroxy compound of high molecular weight may have the following formulae:

(a) R₁OB(OH)₂
(b) R₁OR₂OB(OH)₂
(c) R₁COOR₂OB(OH)₂

In the above formulae R₁ is a monovalent alcohol radical of high molecular weight and R₂ a bivalent radical of the lower polyhydric alcohol. Both groups may contain substituents if desired.

The abovementioned compounds are derived from boric acid, but of course similar compounds can be obtained from phosphorous and phosphoric acid.

Other compounds suitable for introducing the lower monohydric group by the process forming the object of the invention are those obtained by esterifying one or two free hydroxy groups in the compounds (a)–(c) with a lower polyhydric alcohol. The substances obtained thereby may have the following formulae:

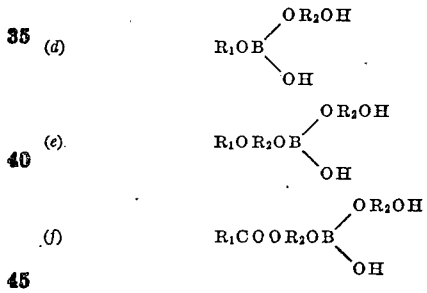

For simplicity's sake all lower polyhydric alcohol radicals are indicated by the symbol R₂, but it is not necessary that the polyhydric alcohol radicals present in the molecule are derived from the same polyhydric alcohol.

In the compound described above the polyhydric alcohol one hydroxy group of which is already esterified with the acid derived from boron or phosphorus can be again esterified with another molecule of one of the said inorganic acids. A compound of the said character may have the following formula:

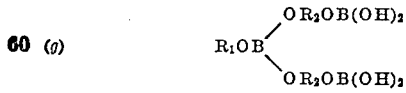

The inorganic acid radicals in the said compounds may belong to the same or to different acids derived from boron or phosphorus.

I wish it to be understood that the compounds described above and the substances obtained by sulphonating the same have been described in prior patents and I do not make any claim to the manufacture or the use of the said compounds for textile purposes. The invention only concerns those products which are obtained by esterifying in the said compounds a free hydroxy group of the acid derived from boron or phosphorus with a lower monohydric hydroxy compound. Examples of substances according to the invention in non-sulphonated condition are

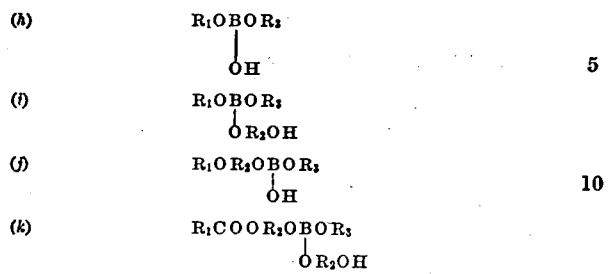

In the above formulae R₃ represents the lower monohydric hydroxy group. They are derived from the formulae (a), (b), (d) and (f), but substances of a similar character may be obtained from the other compounds in which a free hydroxy group of the acid derived from boron or phosphorus is present.

The lower monohydric group may be introduced before, during or after the sulphonating process according to esterification processes known per se. In the last case it is advantageous to wash the reaction mixture of the sulphonating process with water to remove the excess of acid and treating the washed product, preferably at elevated temperature, with the lower alcohol or other hydroxy compound.

With respect to the other components the sequence of introduction of the same into the acid derived from boron or phosphorus may also be varied. It is e. g. possible to esterify the inorganic acid first with the lower monohydric hydroxy compound and thereafter to introduce the other group and groups and subsequently to sulphonate the mixed ester obtained in this way.

It is also possible to esterify two free hydroxy groups of the acid derived from boron or phosphorus with a lower monohydric hydroxy compound. When sulphonating the compound obtained one of the lower alcohol groups is generally removed.

In the compounds in which one of the hydroxy groups of the inorganic acid is esterified with a polyhydric alcohol the free hydroxy group of the polyhydric alcohol radical may be substituted by an alkyl or acyl group.

*Example 1*

200 parts by weight of lauryl alcohol (dodecanol 1) are esterified with 70 parts by weight of boric acid. 70 parts by weight of propanol 2 are allowed to react with the same. The product obtained is sulphonated with an excess of sulphuric acid below 50° C.; the reaction product is washed, if desired, and neutralized.

*Example 2*

300 parts by weight of glycol ether of octadecanol 1 are treated with 150 parts by weight of PCl₃. The product obtained is esterified with 150 parts by weight of butanol and subsequently sulphonated, washed and neutralized at low temperature.

*Example 3*

By allowing 200 parts by weight of pentanol 1 to react with 400 parts by weight of the boric ester of oleic acid monoglyceride, a product is obtained which after sulphonation and neutralization has an excellent wetting property.

*Example 4*

A mixture of 50 parts by weight of the boric acid ester of lauric acid monoglyceride and 50 parts by weight of butanol 1 is sulphonated below 30° C. After washing the mixture is neutralized, the temperature being kept very low. The product obtained has good cleansing and wetting properties.

*Example 5*

70 parts by weight of boric acid are allowed to react with 300 parts by weight of secondary octanol 1 at boiling temperature, with continuous stirring. The product obtained is carefully sulphonated and neutralized and shows excellent wetting properties.

*Example 6*

150 parts by weight of the boric ester of benzyl alcohol are esterified with 75 parts by weight of butanol 1. After sulphonation the product shows good wetting properties.

*Example 7*

400 parts by weight of the boric ester of oleic acid monoglyceride are introduced into 150 parts by weight of $PCl_3$. The reaction product is then esterified with butanol 1. By sulphonation an excellent wetting agent is obtained.

*Example 8*

230 parts by weight of a technical mixture, substantially consisting of secondary alcohols with 10-18 carbon atoms are esterified with 62 parts by weight of boric acid and then with 75 parts by weight of butanol 1, and subsequently sulphonated.

The product obtained is neutralized in a known way. It has excellent wetting properties.

*Example 9*

350 parts by weight of elaidinic acid monoglyceride are esterified with 60 parts by weight of boric acid and then esterified with propanol 2. The sulphonated and neutralised product has good wetting and dispersing properties for textile purposes.

*Example 10*

The product obtained according to Example 3—in which instead of pentanol 1 also e. g. butanol 1 or propanol 2 might be used—has a. o. the peculiar property to disperse a lime soap dried upon fibres. Wool containing calcium soap is fully cleaned by a treatment with a bath containing 1-3 gr. of the compound.

*Example 11*

1 mol glycol is esterified with 1 mol of cocoanut oil fatty acid and then with boric acid or with $P_2O_5$. The product obtained is then esterified with 1 mol of α methyl α isopropylethyleneglycol (dimethyl 2,3 butandiol 3,4) and finally the third OH group of the inorganic acid is esterified with propanol 2. The compound obtained is sulphonated, it has very good wetting properties.

*Example 12*

100 parts by weight of the boric acid ester of oleic acid monoglyceride are sulphonated together with 20 parts by weight of propanol 2 with 220 parts by weight of sulphuric acid at a temperature of 30-35° C. The sulphonate is washed with water and sulphate of sodium and then neutralised. The product obtained has a very good wetting power.

*Example 13*

280 parts by weight of the boric acid ester of oleic acid monoglyceride as described above are treated at 30° C. with 350 parts by weight of a sulphuric acid. The product is washed in the presence of 200 parts by weight of butanol 1, separated and boiled for a short time. After this the mixture is neutralised. The product obtained has good wetting properties.

The Examples 12 and 13 show that the esterification need not necessarily precede the sulphonation, but may also take place during or after the sulphonation. In the last case the sulphonated mixture may be washed with water before esterification in order to remove the excess of the sulphonating agent.

The compounds according to the invention are very active wetting out, dispersing, emulsifying, cleansing, washing, softening and foaming agents for textile purposes. They can also be used in the paper and the leather industries and for producing cosmetical compositions. They are generally suitable for manufacturing liquid baths, the capillary properties of which must be improved.

I claim:

1. A process for the manufacture of a mixed ester suitable for textile purposes comprising esterifying at least one hydroxy group of an acid selected from the group consisting of boric, phosphorous and phosphoric acids with an aliphatic hydroxy compound of high molecular weight and esterifying at least one other hydroxy group of the said acid with a lower monohydroxy compound, both hydroxy compounds belonging to the group consisting of alcohols, partial ethers of an alcohol with a lower polyhydric alcohol, and partial esters of a fatty acid with a lower polyhydric alcohol, and sulphonating in any desired stage of the process of manufacture of the mixed ester.

2. A process for the manufacture of a mixed ester suitable for textile purposes comprising esterifying one hydroxy group of an acid selected from the group consisting of boric, phosphorous and phosphoric acids with an aliphatic hydroxy compound of high molecular weight, one hydroxy group of the said acid with a lower monohydric alcohol, and one hydroxy group of the said acid with a lower polyhydric alcohol, said aliphatic hydroxy compound belonging to the group consisting of alcohols, partial ethers of an alcohol with a lower polyhydric alcohol, and partial esters of a fatty acid with a lower polyhydric alcohol, and sulphonating in any desired stage of the process of manufacture of the mixed ester.

3. A process for the manufacture of a mixed ester suitable for textile purposes comprising esterifying at least one hydroxy group of an acid selected from the group consisting of boric, phosphorous and phosphoric acids with an aliphatic hydroxy compound of high molecular weight, sulphonating the resultant ester, washing the reaction mixture to remove the excess of sulphuric acid, and esterifying at least one remaining hydroxy group of the said first-named acid with a lower monohydric hydroxy compound, both said hydroxy compounds belonging to the group consisting of alcohols, partial ethers of an alcohol with a lower polyhydric alcohol and partial esters of a fatty acid with a lower polyhydric alcohol.

4. A process for the manufacture of a mixed ester suitable for textile purposes comprising esterifying at least one hydroxy group of an acid selected from the group consisting of boric, phosphorous and phosphoric acids with an aliphatic hydroxy compound of high molecular weight and esterifying one other hydroxy group of the said acid with a lower polyhydric alcohol, sulphonating the resultant ester, washing the reaction mixture to remove the excess of sulphuric acid, and esterifying the remaining hydroxy group of the said first-named acid with a lower monohydric hydroxy compound, both said hydroxy compounds belonging to the group consisting of alcohols, partial ethers of an alcohol with a lower polyhydric alcohol and partial esters of a fatty acid with a lower polyhydric alcohol.

5. Textile agents consisting substantially of sulphonated esters of an acid selected from the group consisting of boric, phosphorous and phosphoric acids, in which at least one hydroxy group of the said acid is esterified with an aliphatic hydroxy compound of high molecular weight and at least one hydroxy group with a lower monohydric hydroxy compound, both said hydroxy compounds belonging to the group consisting of alcohols, partial ethers of an alcohol with a lower polyhydric alcohol and partial esters of a fatty acid with a lower polyhydric alcohol.

6. Textile agents consisting substantially of sulphonated esters of an acid selected from the group consisting of boric, phosphorous and phosphoric acids, in which one hydroxy group is esterified with an aliphatic hydroxy compound of high molecular weight, one hydroxy group with a lower monohydric hydroxy compound and one hydroxy group with a lower polyhydric alcohol, both said hydroxy compounds belonging to the group consisting of alcohols, partial ethers of an alcohol with a lower polyhydric alcohol and partial esters of a fatty acid with a lower polyhydric alcohol.

MEINDERT DANIUS ROZENBROEK.